Dec. 14, 1948.   D. F. MILLER ET AL   2,456,438
NONSKID DEVICE APPLIER AND REMOVER

Filed Jan. 30, 1948   3 Sheets-Sheet 2

INVENTORS
DOLA F. MILLER
FRANK PUSLECKI
BY Arthur L. Slee
THEIR ATTORNEY.

Dec. 14, 1948.  D. F. MILLER ET AL  2,456,438
NONSKID DEVICE APPLIER AND REMOVER
Filed Jan. 30, 1948  3 Sheets-Sheet 3

INVENTORS
DOLA F. MILLER
FRANK PUSLECKI
BY Arthur L. Slee
THEIR ATTORNEY

Patented Dec. 14, 1948

2,456,438

UNITED STATES PATENT OFFICE 2,456,438

NONSKID DEVICE APPLIER AND REMOVER

Dola F. Miller and Frank Puslecki,
San Francisco, Calif.

Application January 30, 1948, Serial No. 5,354

6 Claims. (Cl. 152—214)

1

The present invention relates to improvements in a nonskid device applier and remover wherein a spirally grooved disk slidably mounted upon a rear axle of a motor vehicle, for limited longitudinal movement only, operates in conjunction with links operatively connected to the inner ends of a plurality of flexible cleats, slidable upon a side of a motor vehicle wheel, to extend said cleats and arrange the same in transverse spaced relation around the periphery or tread of a tire mounted upon said wheel.

The primary object of the present invention is to provide a new and improved nonskid device applier and remover having improved means arranged to move a plurality of flexible cleats in spaced relation transversely around the periphery or tread of a motor vehicle tire.

Another object is to provide a new and improved device of the character set forth having improved means arranged normally to form and hold a plurality of flexible cleats in transverse spaced relation around the tread of a motor vehicle tire.

A further object is to provide a new and improved device of the type described, having improved means arranged automatically to apply a nonskid device upon and around the tread of a motor vehicle tire when said vehicle is moved in one direction, and to automatically remove said device when said vehicle is moved in an opposite direction.

The invention comprises the details of construction and the arrangement of the several parts as disclosed in the drawings forming a part of the present application, and in which—

Fig. 3 is an enlarged, broken detailed view of the link-engaging disk, showing the cleats extended;

2

Figure 7:
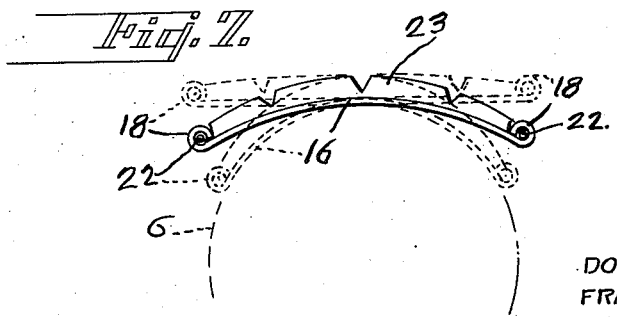
Figure 5:
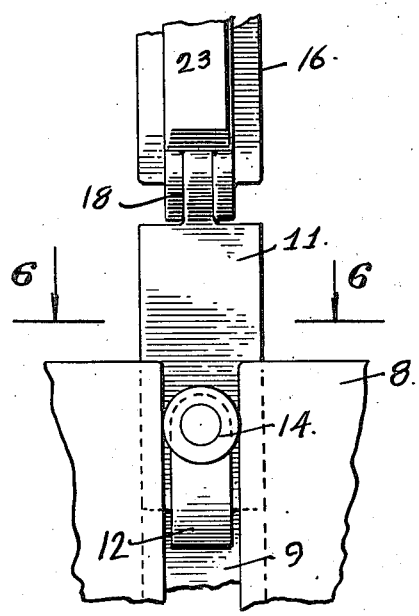
Fig. 5 is an enlarged, broken portion of a front elevation of a detail of the cleat actuating link.
Figure 6:
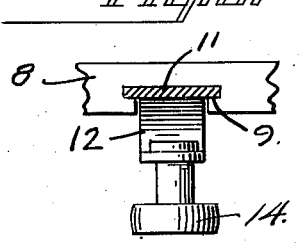

Fig. 6 is a sectional view taken on line 6—6 of Fig. 5, in the direction indicated; and Fig. 7 is a detailed schematic view disclosing the approximate curvature and extreme opposite positions of the flexible cleats.

Referring to the drawings:

The numeral 1 is used to designate a rear axle housing of a motor vehicle, 2 the differential housing thereof, 3 a driving axle or shaft, and 4 a rear wheel with the usual tire 6 and brake drum 7.

Secured preferably to the inner side of the wheel 4 is a disk 8 provided with a plurality of equally spaced radial grooves 9 within each of which is slidably mounted, for longitudinal movement only therein, a link 11, having on the inner end thereof a return bend 12 provided with a roller 14, the purpose of which hereinafter more fully will be set forth.

Figure 1:
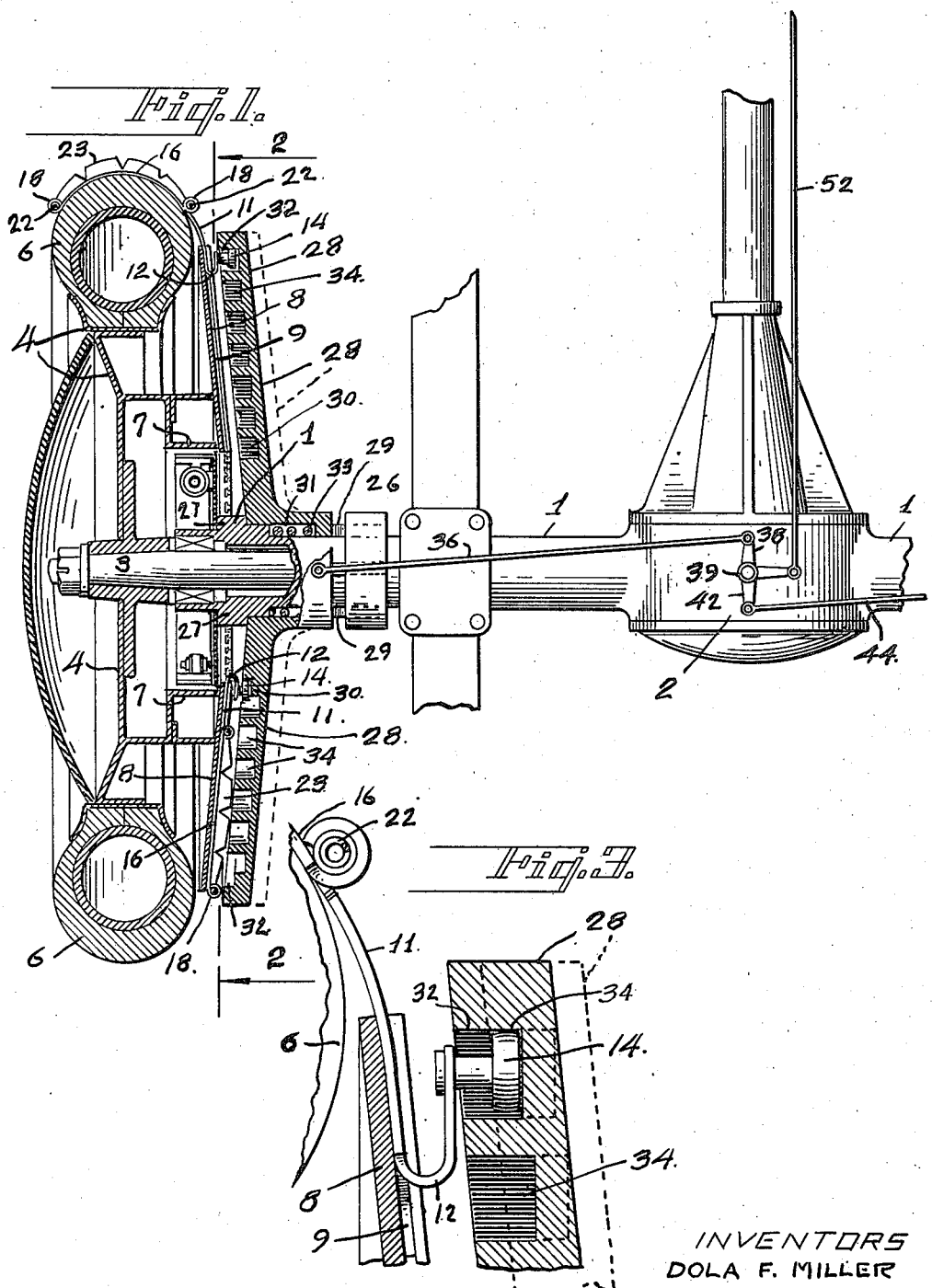
Fig. 1 is a broken, partly sectional, schematic view of the improved device as applied to a rear wheel and tire of a motor vehicle, with the upper half of said wheel showing the nonskid device applied, and the lower half of said tire and wheel disclosing the nonskid device removed or retracted to an inoperative position.
Figure 2:
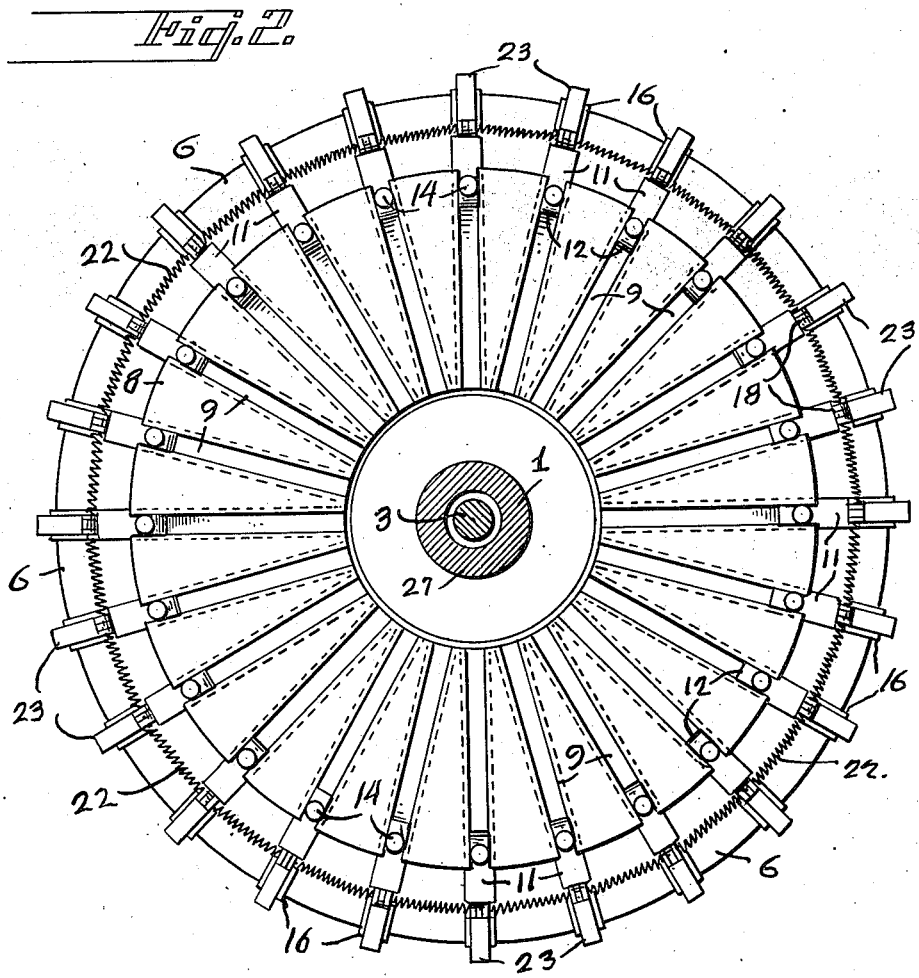
Fig. 2 is a view taken on line 2—2 of Fig. 1, in the direction indicated, but with both the upper and lower halves of said wheel showing the nonskid device applied.

Each link 11 is hingedly connected at its outer end to the inner end of one of a plurality of flexible cleats 16, preferably of thin flexible steel or the like, normally arcuate on a radius twice the transverse radius of the tire 6, as disclosed in detail in Fig. 7 of the drawings, and arranged to be flexed or formed at spaced intervals transversely around the tread of the tire 6, as disclosed in the upper portion of Fig. 1, and around the periphery as in Fig. 2 of the drawings. These flexible cleats 16 are provided with eyelets 18 at each end thereof through which are threaded a pair of circular coil springs 22, the tensions of which springs are arranged to flex said cleats 16 and form and hold the same transversely around the tread of the tire 6. Mounted upon each cleat 16 is a block 23 of nonskid material, such as rubber or the like. Each cleat 16 is of the same width as the width of the links 11 and arranged to follow said links into the radial grooves of the disk 8, in a manner and for a purpose hereinafter more fully set forth.

Slidably mounted for limited longitudinal movement only upon the axle 1 and between a collar 26 and a shoulder 27 on said axle 1, is a second disk 28, having a recess 31 in the hub thereof within which is interposed a spiral spring 33 normally arranged to move and hold the second disk 28 away from the radially grooved disk 8. This second or spirally grooved disk 28 is provided with a pair of inner and outer concentric, comparatively shallow grooves, 30 and 32, respectively, connected by means of a deeper spiral or convolute groove 34.

It should be particularly noted that this second or spirally grooved disk 28 is splined to the axle housing 1 and collar 26 thereon, as at 29, to prevent rotation of said disk 28.

This disk 28, while normally receded from the radially grooved disk 8 by the spring 33, may be moved toward the same by manually actuated means comprising a rod 36 connected to the hub of the disk 28 and also to one arm 38 of a triple bell crank 39, while a similar rod 44 is connected to the arm 42 and to an opposite nonskid device operating mechanism upon the other end of the axle housing, which mechanism, being a duplicate of that shown, has been omitted. An operating rod 52 leads from the bell crank 39 to a remote point of control, not shown.

In operation:

While the second or spirally grooved disk 28 is normally receded, and the cleats 16 also are receded or in an inoperative position, the rollers 14 upon the inner ends of the links 11 loosely traverse the inner concentric groove 30, while the wheel 4 is rotating, said rollers 14 normally being held against the inner wall, substantially, of the inner concentric shallow groove 30 by the combined tensions of the spring rings 22, thereby tending to converge said links 11 within their respective radial grooves 9 of the disk 8 rotating with the wheel 4 and tire 6 thereon.

When it is desired to apply the cleats 16 to the tread of the tire 6, the vehicle is slowed down or stopped, and, through the medium of the manually actuated rods 52, 44 and 36, the second or spirally grooved disks on opposite ends of the axle housing 1 are moved toward the radially grooved disk 8, depressing the rollers 14 upon their elastic return bends 12 and against the bottom of the inner shallow concentric groove 30.

Figure 4:
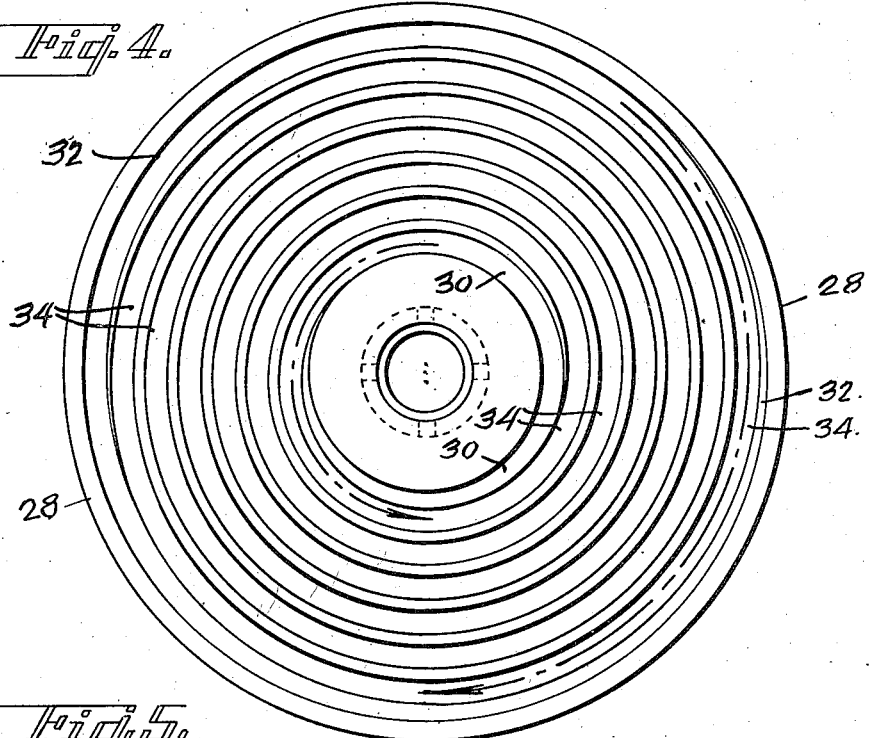
Fig. 4 is an elevation of the spirally grooved disk as seen on the line 2—2 of Fig. 1, opposite to the direction indicated.

Assuming the wheel 4 and tire 6 thereon to be rotating in the direction of the inner broken arrow in Fig. 4 of the drawings, it will be apparent that as the wheel 4 and tire 6 rotates, the rollers 14 will be pressed into the deeper convolute or spiral groove 34, as indicated by said inner curved and broken arrow in Fig. 4 of the drawings, moving the links 11 and cleats 16 outwardly until said rollers 14 enter the outer concentric groove 32, at which time all of the cleats 16 will be fully extended and, by the combined tensions of the springs 22, formed around and held upon the tread of the tire 6, as fully disclosed in the upper half of Fig. 1, and around the periphery of Fig. 2 of the drawings. By means of the manually actuated rods 36, 38, and 42, and the tension of the coil spring 33, the spirally grooved disk 28 is moved away from the radially grooved disk 8, so that the rollers 14 then will be only loosely or inoperatively engaged by the outer concentric groove 32 of the disk 28.

To retract or remove the cleats 16, the above operation is reversed, in which case the rollers 14 will be forced into and returned through the spiral groove 34 as indicated by the outer broken and curved arrow in Fig. 4 of the drawing, until said rollers 14 enter the inner, shallow concentric groove 30, at which time all of the cleats 16 will be receded to an inoperative position.

Having described our invention, we claim:

1. A nonskid device applier and remover comprising the combination with a motor vehicle axle, wheel and tire thereof, of a nonskid device comprising a plurality of spaced resilient, flexible cleats arranged to be bent transversely around the tread of a tire; a radially grooved disk mounted upon a side of said wheel; links slidably mounted within said radially grooved disk and operatively connected to said cleats; and a second disk slidably mounted upon said axle and having a spiral groove therein arranged to engage said links and to extend the same to move said cleats transversely around the tread of said tire.

2. A nonskid device applier and remover comprising the combination with a motor vehicle axle, wheel and tire thereof, of a nonskid device comprising a plurality of spaced and connected flexible cleats arranged to be bent transversely around the tread of said tire; a radially grooved disk mounted upon one side of said wheel; links slidably mounted within said radially grooved disk and operatively connected to said cleats; a second disk slidably mounted upon said axle and having a spiral groove therein arranged to engage said links and to extend the same to move said cleats transversely around the tread of said tire; and elastic means connecting the ends of said cleats and arranged normally to hold said cleats around said tread.

3. A nonskid device applier and remover comprising the combination with a motor vehicle axle, wheel and tire thereof, of a nonskid device comprising a plurality of spaced flexible cleats arranged to be bent transversely around the tread of said tire; a disk having radial grooves therein mounted upon one side of said wheel; links slidably mounted within said grooves and operatively connected to said cleats; a second disc, having a spiral groove therein, slidably mounted upon said axle for longitudinal movement only and arranged to operatively engage said links and to extend the same to move said cleats onto and transversely around the tread of said tire in spaced relation; and a pair of circular spring rings connecting the inner and outer ends of said cleats circumferentially, respectively, and arranged to form and hold said cleats around the tread of said tire.

4. A nonskid device applier and remover comprising the combination with a motor vehicle axle, wheel and tire thereof, of a plurality of flexible cleats arranged to be bent transversely around the tread of said tire; a disk having radial grooves in one face thereof mounted upon one side of said wheel; links slidably mounted within said radial grooves and operatively connected to said cleats; a second disc having a spiral groove therein and slidably mounted for longitudinal movement only upon said axle, said spiral groove being arranged to operatively engage said links and to extend the same and said cleats connected thereto transversely around the tread of said tire; and spring means arranged normally to move said second disk to disengage the spiral groove thereof from said links.

5. A nonskid device applier and remover comprising the combination with a motor vehicle axle, wheel and tire thereof, of a plurality of flexible cleats arranged to be bent transversely around the tread of said tire; a disk having radial grooves therein and mounted upon one side of said wheel; links slidably mounted within said radial grooves and operatively connected to said cleats; a second disk having a spiral groove therein and slidably mounted upon said axle, said spiral groove being arranged to operatively engage said links and to extend the same and said cleats transversely around the tread of said tire; spring means arranged normally to move said second disk to disengage the spiral groove thereof from engaging relation with said links; and manually actuated means arranged to move said disk and spiral groove therein to engage said links 6. A nonskid device applier and remover comprising the combination with a motor vehicle axle, wheel and tire thereof, of a nonskid device comprising a plurality of flexible cleats arranged to be formed around the tread of said tire; a disk having radial grooves therein and mounted upon one side of said wheel; links slidably mounted in said grooves and connected to said cleats; a second disk having a spiral groove therein and slidably mounted upon said axle and arranged to engage said links and to extend the same to move said cleats onto and around the tread of said tire transversely, when said wheel is rotated in one direction, and to retract said cleats from said tread when said wheel is rotated in an opposite direction.

DOLA F. MILLER.
FRANK PUSLECKI.

No references cited.